UNITED STATES PATENT OFFICE.

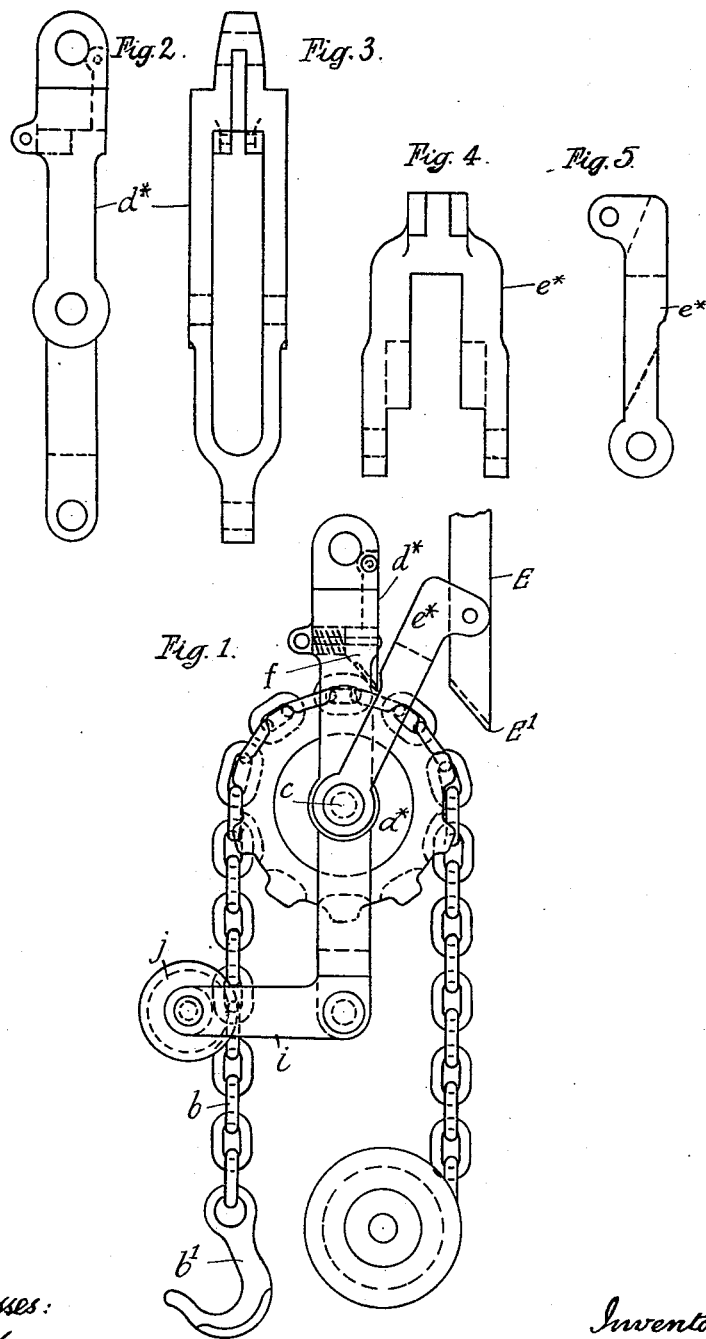

JOHN DAVIES, OF MISKIN, MOUNTAIN ASH, AND JOHN DAVIES, OF PENRHIWCEIBER, ENGLAND.

HAULING-TACKLE.

1,100,956. Specification of Letters Patent. Patented June 23, 1914.

Application filed March 5, 1914. Serial No. 822,725.

*To all whom it may concern:*

Be it known that we, JOHN DAVIES, a subject of the King of England, residing at Miskin, Mountain Ash, in the Kingdom of England, and JOHN DAVIES, a subject of the King of England, residing at Penrhiwceiber, in the Kingdom of England, have invented a new and useful Hauling-Tackle, of which the following is a specification.

The object of our invention is to provide a simple and efficient hauling tackle.

Further objects and advantages of the invention will be set forth in the detailed description which now follows.

The invention is illustrated in the accompanying drawings in which:

Figure 1 is a plan of the complete apparatus, part of the operating lever being broken away; Fig. 2 is a side view of the bracket; Fig. 3 is a face view of same; Fig. 4 is a face view of the forked member of the operating lever; Fig. 5 is a side view of same.

The hauling tackle according to the present invention is for use in mines and consists of a grooved chain-wheel $a^*$ with chain $b$ and mounted on an axle $c$ in a bracket $d^*$ fitted with a stop-pawl $f$. The bracket $d^*$ has a lower arm $i$ standing out at right angles and carrying a guide wheel $j$ for the chain. The chain-wheel $a^*$ is operated by a handlever E with sharpened nose $E^1$. The lever E is pivoted to a forked part $e^*$ which is mounted on the axle $c$.

When the lever E is pushed back, the nose $E^1$ recedes from the forked part $e^*$ and disengages from the chain, which is then retained by the pawl $f$. In pulling the lever E forward, the nose $E^1$ grips the chain and so turns the chain-wheel $a^*$ around in order to haul along any article attached to the hook $b^1$.

We claim:

Hauling tackle consisting of a chain-wheel, a chain, an axle for said chain wheel, a bracket carrying the axle, a pawl mounted in the bracket, an arm connected with said bracket, a guide pulley journaled in the arm, an operating lever pivoted on the axle and a nose to grip the chain as and for the purpose described.

JOHN DAVIES.
JOHN DAVIES.

Witnesses:
JOHN HOLMAN,
EDGAR DAVIES.

Copies of this patent may be obtained for five cents each, by addressing the "Commissioner of Patents, Washington, D. C."